United States Patent Office 2,887,468
Patented May 19, 1959

2,887,468

COPOLYESTERS OF A GLYCOL, A DICARBOXYLIC ACID AND A HYDROXY CARBOXYLIC ACID

John R. Caldwell and John W. Wellman, Kingsport, Tenn., assignors to Eastman Kodak Company, Rochester, N.Y., a corporation of New Jersey No Drawing. Application March 11, 1954
Serial No. 415,702

6 Claims. (Cl. 260—47)

This invention relates to polymeric materials, and particularly to fiber-forming linear polymers having improved dyeing properties.

A large number of synthetic linear condensation polymers are known to the art, and such polymers are ordinarily prepared by reacting a polybasic organic acid with a polyhydric alcohol, with or without the use of a condensation catalyst. The high molecular weight products which are thereby obtained are capable of being drawn into oriented fibers of the type described in U.S. Patent 2,071,250. The usual polyester fibers, such as those prepared from polyethylene terephthalate, are very difficult to dye, however, and special methods are usually employed in order to achieve any satisfactory degree of dyeing. Thus, at the present time, polyester fibers must be dyed at super atmospheric pressures with cellulose acetate dyes in order to obtain practical shades. This process requires the use of expensive equipment and is time consuming. An alternative process which has been used involved effecting the dyeing in the presence of a dye assistant or swelling agent such as phenol, cresol, benzoic acid, dichlorobenzene, or similar material. This process suffered the disadvantage, however, of often causing non-uniform swelling of the fiber with a resultant non-uniform application of the dye. Furthermore, most of the dyeing assistants were objectionable to use because of expense, toxicity, objectionable odor, or similar disadvantage.

It is accordingly an object of this invention to provide new linear polyesters from which fibers can be prepared which have improved dye affinity, especially for cellulose acetate type dyes.

Another object of the invention is to provide new and improved linear polyesters containing a dibasic aromatic hydroxy acid in the main molecular chain.

Another object of the invention is to provide new and improved polyesters suitable for the manufacture of fibers which can be dyed to practical shades under ordinary conditions with or without the use of super atmospheric pressures or dyeing assistants.

Another object of the invention is to provide a method for incorporating a dibasic aromatic hydroxy acid into high molecular weight, fiber-forming polyesters to impart improved resistance against degradation by ultraviolet light and weathering.

Another object of the invention is to improve the dyeing properties of polyester fibers without substantially altering the melting point, tensile strength, elongation, or elastic recovery of the fibers.

Other objects will be apparent from the description and claims which follow.

These and other objects of the invention are accomplished by reacting, to form a linear polyester, a polycarboxylic compound which can be either a polybasic organic acid or an ester thereof, a polyhydroxylic compound which can be either a polyhydric alcohol or an ester thereof, and a hydroxy aromatic dibasic acid containing at least one and not more than two aromatic nuclei and having two carboxylic groups joined directly to the aromatic nuclei and not more than one phenolic hydroxyl group on each aromatic nucleus. The hydroxy aromatic dibasic acids can be employed in either the free or esterified form wherein the carboxyl groups are esterified with a lower alkyl group of from 1 to 4 carbon atoms. Since it is immaterial to the course of the polyester reaction whether the polybasic acid or the aromatic hydroxy acid are esterified or not, particularly when an unesterified glycol is employed as the polyhydroxylic compound, it will be understood that the organic acids hereinafter referred to are intended to include the esters thereof.

The terpolymers of high molecular weight which are thus obtained can be drawn into oriented fibers which have improved affinity for dyes, and particularly for cellulose acetate type dyes. The modified polyesters prepared in accordance with this invention retain the desirable physical and chemical properties of the polyesters usually prepared by coreacting the polyhydric alcohol and the polybasic organic acid, and in addition have the improved properties imparted by the presence of the hydroxy aromatic groups in the main molecular chain.

The terpolymers of this invention are conveniently prepared by heating a mixture of the polybasic acid, preferably in ester form, polyhydric alcohol, and a hydroxy aromatic dibasic acid as herein defined and either free or esterified, at atmospheric pressure, and preferably in the presence of a suitable condensation catalyst such as an amphoteric metal compound. The condensation reaction is desirably effected under an atmosphere of nitrogen and at a temperature of from about 150 to 300° C., and preferably from about 200 to 300° C. The condensation reaction is carried out until the product has a sufficiently high molecular weight to exhibit fiber-forming properties. The fiber-forming stage can be checked by touching the molten polymers with a rod and drawing the rod away. When the fiber-forming stage has been reached, a continuous filament of considerable strength will be pulled from the melt in this manner. This stage is generally reached when the polymer has an intrinsic viscosity of at least 0.4, the intrinsic viscosity being defined as $$\frac{\log_e N_r}{C}$$

in which $N_r$ is the viscosity of a dilute solution of the polymer in m-cresol divided by the viscosity of m-cresol in the same units and at the same temperature, and $C$ is the concentration in grams of polymer per 100 cc. of solution. Measurement of the intrinsic viscosity is generally the most convenient method for following the course of the reaction. In most cases, it is usually desirable to continue the reaction until the intrinsic viscosity is above 0.4, and preferably above 0.6. The polymers thus obtained have excellent fiber-forming and cold drawing properties in addition to high melting points, tensile strength, elongation and elastic recovery. These polymers are crystalline, linear polymers which can be formed into fibers which are oriented along their axis.

In practicing the invention any of the hydroxy aromatic dibasic acids as defined herein can be used to prepare the modified polyesters embodying this invention. Thus the hydroxy acids can be those containing a single aromatic nucleus bearing two carboxylic groups and a single hydroxylic group such as the phthalic acids of the formula

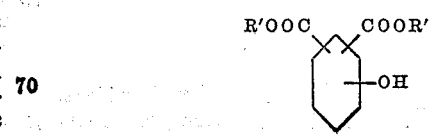

in which each R' is either hydrogen or an alkyl group, preferably of 1 to 4 carbon atoms; or the hydroxy aromatic dibasic acids can be those containing two or more unfused aromatic nuclei with a carboxylic group joined to each terminal nucleus and one phenolic hydroxyl group on at least one of the nuclei bearing a carboxylic group. These hydroxy acids thus have the formula

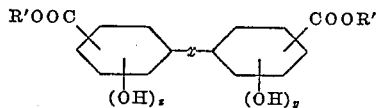

wherein y and z are either 0 or 1, one of y and z being 1, and x is either a direct bond between the two benzene rings or

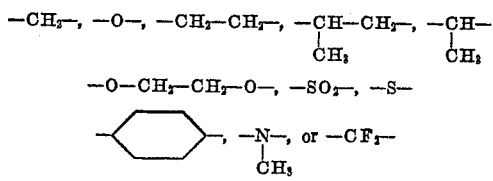

In these hydroxy acids, the carboxylic groups are either meta or para to the linking group x, while the hydroxyl groups can be located in any open position including positions ortho, meta or para to the carboxyl group.

The aromatic dibasic hydroxy acids (or their esters) are employed in an amount of from 5 to 25 mole percent and preferably in an amount of from 10 to 16 mole percent in the polyester where it takes the place of part of the acid constituent of the polymer. Thus, in the process embodying this invention, the hydroxy acid enters directly into the polymer chain and hence modifies the polymer in its molecular structure in a manner quite unlike the modification obtained by attempting to modify a preformed polyester.

The aromatic hydroxy acids employed in practicing the invention are typified by, but not limited to, mononuclear monohydroxy dibasic acids of the formula

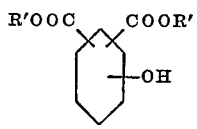

such as 2-hydroxy-terephthalic acid, 5-hydroxy-isophthalic acid, 6-hydroxy-isophthalic acid, 3-hydroxy-O-phthalic acid, 4-hydroxy-O-phthalic acid and esters of these or similar hydroxy acids; dinuclear dihydroxy dibasic acids of the formula

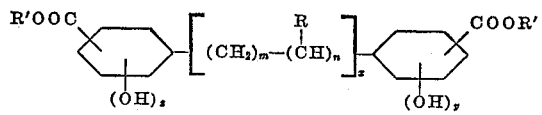

in which m, n, x, y and z are either 0 or 1, one of y and z being 1, and in which R is either hydrogen or a methyl group, such as 4,4'-dicarboxy-2,2'-dihydroxy-diphenyl methane, 4,4'-dicarboxy-2,2'-dihydroxy-diphenyl ethane, 4,4'-dicarboxy - 2,2' - dihydroxy-diphenyl methyl methane, 4,4'-dicarboxy-3,3'-dihydroxy-diphenyl methyl ethane, and esters of these and similar dicarboxy hydroxy diphenyl alkanes; dicarboxy hydroxy diphenyl sulfones of the formula

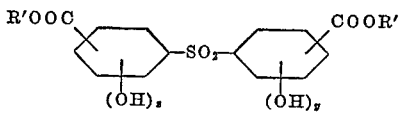

such as 3,3'-dicarboxy-4,4'-dihydroxy-diphenyl sulfone, 4,4'-dicarboxy-3,3'-dihydroxy-diphenyl sulfone, and esters of these and similar sulfone dibasic hydroxy acids; dicarboxy hydroxy diphenyl sulfides of the formula

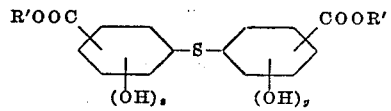

such as 3,3'-dicarboxy-4,4'-dihydroxy-diphenyl sulfide, 4,4'-dicarboxy-3,3'-dihydroxy-diphenyl sulfide, 4,4'-dicarboxy-2,2'-dihydroxy-diphenyl sulfide, and esters of these and similar dibasic hydroxy sulfides; dicarboxy hydroxy diphenyls of the formula

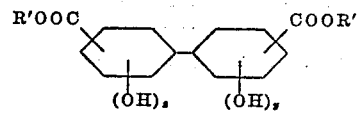

such as 4,4'-dicarboxy-3,3'-dihydroxy diphenyl ether and esters of this and similar dicarboxy hydroxy diphenyl ethers; as well as compounds of the formula

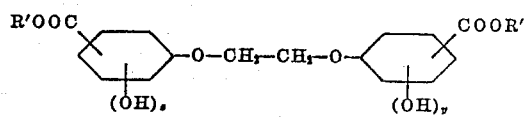

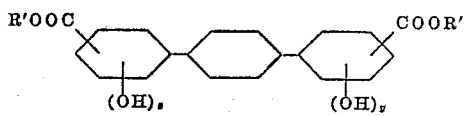

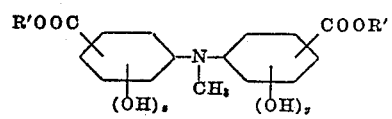

and

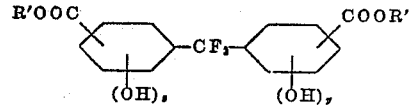

y, z and R' having the values assigned hereinabove. In each of these groups, the carboxylic radicals can be in the 3,3' and 4,4'-positions, and the hydroxyl groups can be in any of the 2,2', 3,3', 4 or 4' positions which are otherwise unsubstituted.

In practicing the invention, the hydroxy acid is reacted with a polybasic organic acid, or an ester thereof, and with a polyhydric alcohol which can be in the form of the free alcohol or esterified as described hereinafter. The reaction is desirably effected in the presence of a condensation catalyst and preferably an organo-metallic catalyst, a large number of which are described in the copending applications of John R. Caldwell, Serial Nos. 313,061 through 313,071 inclusive, filed October 3, 1952 now U.S. Patents 2,744,089–2,744,098 inclusive and 2,744,129. The catalysts which are preferred for use in practicing this invention are the titanium compounds specifically disclosed in application Serial No. 313,072 now U.S. Patent 2,720,502, tin compounds as disclosed in application Serial No. 313,078 now U.S. Patent 2,720,-507, and aluminum compounds as disclosed in application Serial No. 313,077 now U.S. Patent 2,720,506. When such catalysts are employed in preparing the polyester, the esterified polybasic acid and esterified polyhydric alcohols can be readily used instead of the free acids and free polyhydric alcohols. It will, therefore, be understood that this invention includes the use of such acids and alcohols in the form of their esters as well as in the unesterified form, and includes the use of any condensation catalyst or no catalyst in accordance with usual practices.

Thus in practicing the invention any of the well known polybasic organic acids, and particularly the dibasic dicarboxylic acids can be employed for preparation of the modified polymers. These acids include the aliphatic dibasic acids or esters thereof of the formula $$R_1OOC-R_2-COOR_3$$

wherein $R_1$ and $R_3$ are either hydrogen or alkyl radicals containing from 1 to 10 carbon atoms, and $R_2$ is an aliphatic hydrocarbon radical. Thus typical aliphatic dibasic dicarboxylic acids which can be employed include oxalic acid, succinic acid, adipic acid, sebacic acid, α,α-dimethyl glutaric acid, dimethyl malonic acid, diglycollic acid, β-oxydipropionic acid, γ-oxydibutyric acid, maleic acid, fumaric acid, itaconic acid, and similar well known aliphatic dibasic acids. The acids of this type which are preferred are those containing at least 6 carbon atoms. The esters of such acids can also be used, and the alkyl esters wherein each alkyl group contains from 1 to 10 carbon atoms are desirably employed.

The invention is advantageously carried out employing an aromatic dicarboxylic acid or a diester thereof of the formula $$R_1OOC-R_2-X-R_3-COOR_4$$

wherein $R_1$ and $R_4$ each represents hydrogen or an alkyl radical containing from 1 to 10 carbon atoms and $R_2$ and $R_3$ each represents $(CH_2)_{n-1}$, wherein $n$ is an integer of from 1 to 5 inclusive, and X represents a divalent aromatic radical of the formula

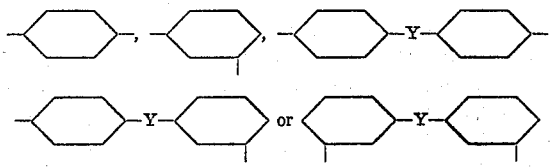

Y representing a radical of the formula

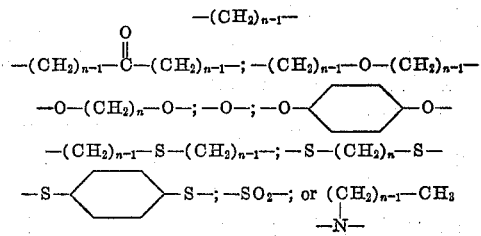

Of such acids, p,p'-sulfonyldibenzoic acid, terephthalic acid, 1,2-di(p-carboxyphenoxy) ethane, 1,2-di(p-carboxyphenyl) ethane and p,p'-diphenic acid are preferred, although any of the other acids or esters of such acids can be employed with good results.

The polyhydric alcohol or ester thereof is preferably an alpha, omega-dioxy compound having the formula $$R_5O-(CH_2)_p-OR_6$$

wherein $p$ is an integer of from 2 to 12 inclusive, and $R_5$ and $R_6$ each represents either a hydrogen atom, or an acyl radical containing from 2 to 4 carbon atoms. The polyhydric alcohols which are preferably employed in practicing the invention are the glycols which are commonly used in the preparation of polyesters such as ethylene glycol, trimethylene glycol, tetramethylene glycol, pentamethylene glycol, hexamethylene glycol, heptamethylene glycol, octamethylene glycol, and similar well known polymethylene glycols. The branched-chain glycols such as 2-methyl-pentanediol and 3-methyl-hexanediol can also be used. Other glycols which are suitable include the ether glycols such as diethylene glycol. Other polyhydroxy compounds containing 3 or more hydroxy radicals are also suitable as typified by glycerol, sorbitol, pentaerythritol, dipentaerythritol, β-methyl glycerol, 2-methyl-2-(hydroxymethyl)-1,3-propanediol, 1,2,4-trihydroxybutane, and similar polyhydroxy compounds. Thus it is apparent that the dihydroxy or polyhydroxy compounds used in practicing this invention need not be the free hydroxy compounds when a catalyst of the organometallic type is employed to promote the polyester formation. The polyhydric alcohol or ester thereof is desirably employed in an amount such that there is an excess of hydroxy or substituted hydroxy radicals over the amount of carboxyl groups in the polybasic acid or esters and the hydroxy acid or acids employed in the reaction. Generally speaking, the hydroxyl groups are desirably present in an amount of from about 1.3 to about 3 times the amount of carboxyl groups, although excess amounts of as much as 10 times or more can be employed in some cases.

It is thus apparent that the dibasic hydroxy acids described herein can be used for preparing any high molecular weight, high melting linear polyester having fiber-forming properties. For example, the aromatic dicarboxylic acids or diesters thereof which are preferably employed include such materials as β-hydroxyethyl diesters of p,p'-sulfonyldibenzoic acid, p,p'-sulfonyldibenzoic acid dibutyl esters, m,p'-sulfonyldibenzoic acid dipropyl esters, m,m'-sulfonyldibenzoic acid dihexyl esters, methyl terephthalate, hexyl terephthalate, isopropyl terephthalate, and various other esters having the following formulas:

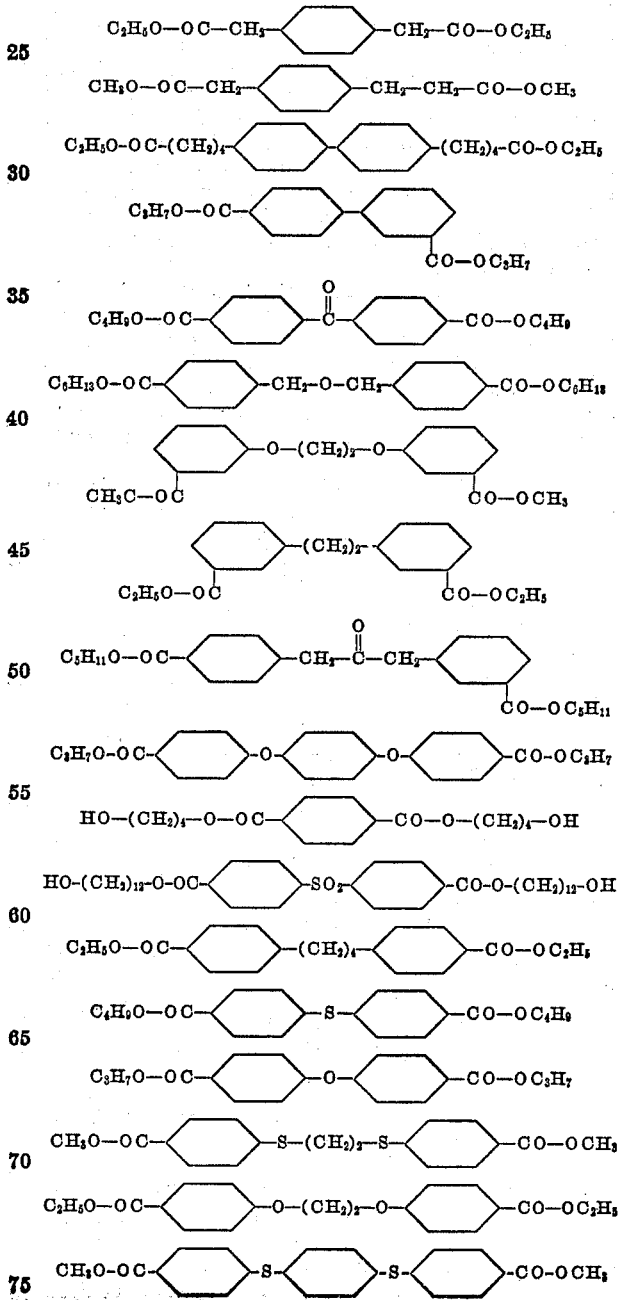

and

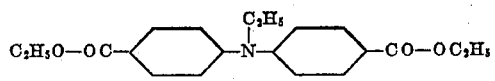

as well as the corresponding free acids.

The dihydroxy compounds which are preferably employed are the straight-chain alkane diols, i.e. the polymethylene glycols, wherein the hydroxy radicals are positioned at the two ends of the alkylene chain. As was indicated, the mono- or diesters of these glycols can also be employed, such as the acetates, propionates, and butyrates of these similar glycols. Suitable ether glycols which can be employed instead of the polymethylene glycols or in conjunction therewith include diethylene glycol, triethylene glycol, tetraethylene glycol, bis(4-hydroxybutyl) ether, bis(3-hydroxypropyl) ether, and similar ether glycols.

When preparing high melting polyesters for the manufacture of synthetic fibers, the amount of aliphatic ether glycol is desirably minimized. Furthermore, the aromatic diacids or diesters preferably contain only p,p' linkages when highly polymeric linear polyesters are desired.

When polyesters are prepared in accordance with this invention, the reaction is desirably effected under an inert atmosphere, and preferably under anhydrous conditions. The reaction is effected at atmospheric pressure, and at an elevated temperature for a period of about 1 hour. Thereafter it is usually desirable to reduce the pressure on the reaction mixture to below about 15 mm. Hg and to raise the temperature of the reaction mixture for a period of from 1 to 6 hours. This permits any alcohol or other volatile material to distill out of the highly viscous polymer melt.

The polymers thus obtained can then be employed in the preparation of fibers or other articles by the usual methods. The polyesters embodying this invention are especially suitable for conversion into fibers by melt-spinning methods. The spun fibers are usually drafted and heat treated in accordance with well known practice to give high melting synthetic fibers of excellent tensile strength.

The modified polyesters of this invention can also be employed for making sheets and films, or for the manufacture of molding products and similar materials. The polymers are readily dyed with cellulose acetate type dyes and also show some affinity for certain classes of acid wool, direct cotton and vat dyes. Although a dyeing assistant is not necessary, one can be used when particularly heavy or dark shades are desired.

The invention is illustrated by the following examples of certain preferred embodiments thereof. The examples are included merely for purposes of illustration and are not intended to limit the scope of the invention unless otherwise specifically indicated.

*Example 1*

Four hundred and twenty g. (1.0 mole) of p,p'-sulfonyldibutyric acid dibutyl ester, 63 g. (0.3 mole) dimethyl hydroxyterephthalate, and 250 g. (2.4 mole) pentamethylene glycol were placed in a reaction vessel equipped with a stirrer, a short distillation column, and an inlet for purified hydrogen. A solution of 0.1 g. titanium tetrabutoxide in 5 cc. of butanol was added as catalyst. The mixture was stirred at 200–210° C. in a stream of hydrogen. A mixture of methyl alcohol and butyl alcohol distilled as the ester-interchange took place. The distillation of the alcohols practically stopped after 1 hour. The temperature was then raised to 260° C. and held for 30 minutes. A vacuum of 0.1 mm. was applied and the mixture was stirred at 260–265° C. for 1.5 hours. A high viscosity polyester was obtained. The inherent viscosity, as measured in 60-phenol-40 tetrachlorethane, was 0.76. Fibers were spun by extruding the melted polymer through a multi-hole spinnerette. The fibers stuck to the hot bar at 188–195° C. They could be dyed to dark shades with cellulose acetate type dyes in a boiling water bath. The fibers showed improved resistance to degradation by ultraviolet light and weathering.

*Example 2*

A mixture of 1.0 mole of p,p'-sulfonyldibutyric acid dibutyl ester, 0.3 mole of dimethyl hydroxyterephthalate and 2.4 moles of hexamethylene glycol was heated at 200–210° C. under hydrogen and in the presence of 0.1 g. of titanium tetrabutoxide. When the distillation of alcohol had ceased, the temperature was raised to 260° C. and held for 30 minutes, after which a vacuum of 0.1 mm. was applied for 1.5 hours at 260–265° C. The resulting polymer could be melt spun into fibers having excellent dyeing properties and high resistance to ultraviolet light and weathering.

*Example 3*

A linear polyester was prepared as in the process of Example 1 using a mixture of 1.0 mole of p,p'-sulfonyldibutyric acid dibutyl ester, 0.20 mole of dimethyl hydroxyterephthalate and 2.4 moles of pentamethylene glycol. Fibers prepared from the polymer thus obtained stuck to the hot bar at 205–210° C. and dyed well with cellulose acetate type dyes in a boiling water bath. Thus by varying the content of hydroxy acid, the physical properties such as melting point can be varied as desired.

*Example 4*

Four hundred and twenty g. (1.0 mole) of p,p'-sulfonyldibutyric acid dibutyl ester, 29 g. (0.12 mole) of 2-hydroxyisophthalic acid diethyl ester, and 208 g. (2.0 moles) of pentamethylene glycol were placed in a reaction vessel as described in Example 1. A solution of 0.2 g. sodium titanium butoxide in 10 cc. butyl alcohol was added as catalyst. A heating schedule similar to that used in Example 1 was employed. The polyester had an inherent viscosity of 0.68 as measured in 60-phenol-40 tetrachlorethane solvent. Fibers were spun by extruding the melted polymer through a multi-hole spinnerette. They had a hot bar sticking temperature of 220–230° C. They dyed well with cellulose acetate type dyes.

*Example 5*

One hundred and ninety-four g. (1.0 mole) of dimethyl terephthalate, 42 g. (0.2 mole) of dimethyl hydroxyterephthalate, and 186 g. (3.0 moles) of ethylene glycol were placed in a reaction vessel as described in Example 1. A solution of 0.15 g. titanium methoxide in 5 cc. of methyl alcohol was added as catalyst. The mixture was stirred at 190° C. in an atmosphere of pure nitrogen. The distillation of methyl alcohol was practically complete after 1 hour. The temperature was raised to 270° C. and held for 30 minutes. A vacuum of 0.1 mm. was applied and the stirring was continued for 2–3 hours to produce a highly viscous melt. The product had an inherent viscosity of 0.80 when measured in a solution of 60 phenol-40 tetrachlorethane. Fibers were spun by extruding the melted polyester through a spinnerette. The fibers stuck to the hot bar at 185–190° C. They dyed readily with cellulose acetate dyes.

*Example 6*

A mixture of 1.0 mole of dimethyl terephthalate, 0.15 mole of 4,4'-dicarboxy-2,2'-dihydroxy diphenyl and 3.0 moles of ethylene glycol was reacted as in the preceding example to give a modified polymer which readily formed fibers of excellent dyeing properties.

*Example 7*

A polyester was made having the composition: 0.88 mole p,p'-sulfonyldibutyric acid, 0.12 mole 4,4'-dihydroxy-3,3'-dicarboxy diphenyl sulfone, and 1.0 mole pentamethylene glycol. It gave fibers that stuck to the hot bar at 215–220° C. The fibers dyed well with cellulose acetate dyes.

Example 8

A polyester having similar properties was made from 0.88 mole of p,p'-sulfonyldibutyric acid, 0.12 mole of 4,4'-dihydroxy-3,3'-dicarboxy diphenyl sulfone, and 1.0 mole of hexamethylene glycol.

Example 9

A polyester was made having the composition: 0.80 mole p,p'-sulfonyldibutyric acid, 0.20 mole 4,4'-dihydroxy-3,3'-dicarboxy diphenyl sulfide, and 1.0 mole pentamethylene glycol. Fibers spun from the polymer dyed well with cellulose acetate dyes.

Example 10

A polyester was made having the composition: 0.85 mole 1,2-di(p-carboxyphenyl) ethane, 0.15 mole 5-hydroxy-isophthalic acid, and 1.0 mole butanediol-1,4. The fibers dyed well with cellulose acetate dyes.

Example 11

A polyester was made having the composition: 0.87 mole 1,2-di(p-carboxyphenoxy) ethane, 0.13 mole 4,4'-dicarboxy-3,3'-dihydroxy diphenyl ether, and 1.0 mole ethylene glycol. The fibers made from this product dyed well with cellulose acetate dyes.

Similar results are obtained using other combinations of a polybasic organic acid, a polyhydric alcohol, and an aromatic dibasic hydroxy acid as defined herein whether free or esterified. As can be seen from the examples, either or all of the dibasic acid, the polyhydric alcohol and the hydroxy acid can be esterified in practicing this invention, or one or more can be in the unesterified form. Mixtures of any of these or similar reactants can be employed in practicing the invention to give polymers having desired properties.

The polymers embodying the invention can be prepared in accordance with the usual processes for making polyesters, including either batch or continuous processes as desired. The products thus obtained are particularly valuable for preparing synthetic fibers of good mechanical properties and improved affinity for dyes. The modified polyesters, however, can be employed for making clear films which can be employed in the manufacture of photosensitive materials such as either black-and-white or color photographic film. Such films can be prepared in accordance with well known practice, either by deposition of a molten layer onto a suitable film-forming surface, or by deposition from a suitable solvent onto a rotating drum. The modified polymers of this invention can also be used for any of the other applications in which the prior polyesters could be used, since the desirable properties of the copolymer are retained in the terpolymer of this invention.

When using the modified polymers of this invention, any of the well known compounding ingredients which are ordinarily employed in conjunction with synthetic resins can be used, and the polymers can be admixed with similar or dissimilar polymers as desired. Fibers are most conveniently prepared from these polymers by melt-spinning processes, but the polymers can be spun from a solution in a suitable organic solvent such as dimethylformamide or dimethylacetamide if desired, in accordance with processes well known to the art.

Although the invention has been described in considerable detail with particular reference to certain preferred embodiments thereof, variations and modifications can be effected within the spirit and scope of the invention as described hereinabove, and as defined in the appended claims.

We claim:

1. The method of preparing improved linear copolyesters which comprises reacting together at a temperature of 150–300° C. to an inherent viscosity of at least 0.4, a mixture of a compound (1) selected from the group consisting of dihydric aliphatic alcohols of 2–12 carbon atoms and $C_2$–$C_4$ acyl esters thereof, a compound (2) free of nuclear hydroxyl substituents and selected from the group consisting of terephthalic acid, p,p'-sulfonyldibenzoic acid, 1,2-di(p-carboxyphenyl) ethane and $C_1$–$C_4$ alkyl esters thereof, and a hydroxy aromatic carboxylic acid compound (3) selected from the group consisting of compounds of the formulas $$\text{HOOC} \diagup \diagdown \text{OH}$$
$$\text{COOH}$$

$$\text{HOOC} \diagup \diagdown [(CH_2)_m-(\overset{R}{CH})_n]_z \diagup \diagdown \text{COOH}$$
$$(OH)_x \qquad (OH)_y$$

$$\text{HOOC} \diagup \diagdown -SO_2- \diagup \diagdown \text{COOH}$$
$$\text{OH} \qquad \text{OH}$$

and $$\text{HOOC} \diagup \diagdown -A- \diagup \diagdown \text{COOH}$$
$$\text{OH} \qquad \text{OH}$$

wherein $m$, $n$, $x$, $y$ and $z$ are from the group consisting of zero and one, at least one of $y$ and $z$ being one, R is from the group consisting of hydrogen and methyl, and A is from the group consisting of oxygen and sulfur and $C_1$–$C_4$ alkyl esters thereof, said compound (3) amounting to 5–25 mole percent of said mixture.

2. The method according to claim 1 wherein the compound (3) amounts to 10–16 mole percent of the mixture.

3. The method according to claim 1 wherein the compound (1) is a polymethylene glycol.

4. A linear copolyester of a compound (1) selected from the group consisting of dihydric aliphatic alcohols of 2–12 carbon atoms and $C_2$–$C_4$ acyl esters thereof, a compound (2) free of nuclear hydroxyl substituents and selected from the group consisting of terephthalic acid, p,p' - sulfonyldibenzoic acid, 1,2 - di(p - carboxyphenyl) ethane, and $C_1$–$C_4$ alkyl esters thereof, and a hydroxy aromatic carboxylic compound (3) selected from the group consisting of compounds of the formulas $$\text{HOOC} \diagup \diagdown \text{OH}$$
$$\text{COOH}$$

$$\text{HOOC} \diagup \diagdown [(CH_2)_m-(\overset{R}{CH})_n]_z \diagup \diagdown \text{COOH}$$
$$(OH)_x \qquad (OH)_y$$

$$\text{HOOC} \diagup \diagdown -SO_2- \diagup \diagdown \text{COOH}$$
$$\text{OH} \qquad \text{OH}$$

and $$\text{HOOC} \diagup \diagdown -A- \diagup \diagdown \text{COOH}$$
$$\text{OH} \qquad \text{OH}$$

wherein $m$, $n$, $x$, $y$ and $z$ are from the group consisting of zero and one, at least one of $y$ and $z$ being one, R is from the group consisting of hydrogen and methyl, and A is from the group consisting of oxygen and sulfur and $C_1$–$C_4$ alkyl esters thereof, said compound (3) amounting to 5–25 mole percent of said mixture, said copolyester having an inherent viscosity of at least 0.4.

5. Synthetic fiber of the copolyester of claim 4.

6. A linear copolyester as defined in claim 4 wherein the compound (2) is dimethyl terephthalate and the compound (3) is dimethylhydroxy terephthalate.

References Cited in the file of this patent

UNITED STATES PATENTS

| | | |
|---|---|---|
| 2,662,871 | Bock | Dec. 15, 1953 |
| 2,753,373 | Hutchings et al. | July 3, 1956 |

FOREIGN PATENTS

| | | |
|---|---|---|
| 451,278 | Great Britain | July 29, 1936 |

OTHER REFERENCES

Paint Oil and Chem. Review, inside back cover, January 25, 1945.

Hill et al.: J. Polymer Sci. 3, 609–630 (1948).